Oct. 26, 1943.　　　　G. S. TURNER　　　　2,333,060
CONTROL MECHANISM FOR LOCOMOTIVE SANDERS
Filed March 25, 1942
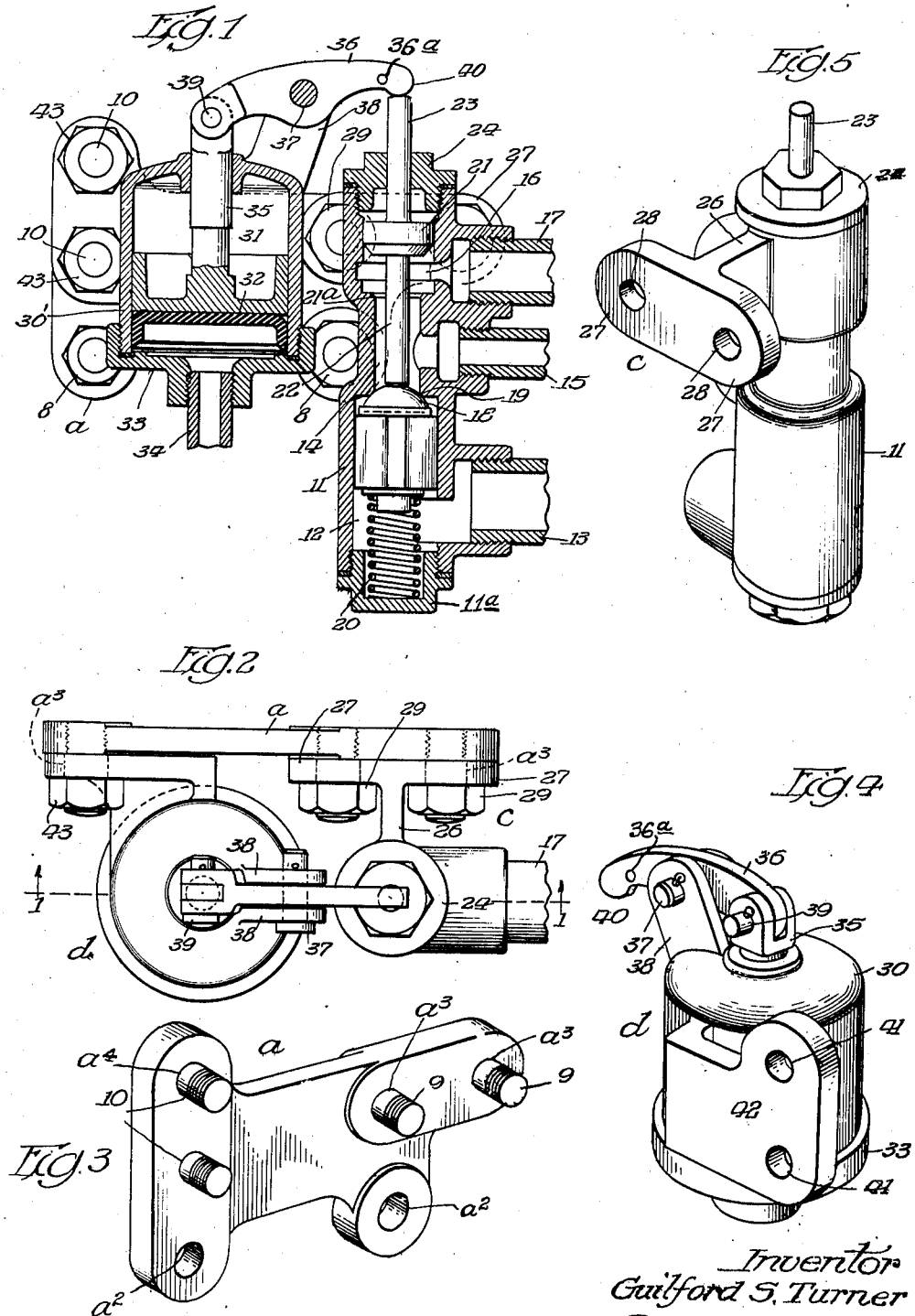
Inventor
Guilford S. Turner
By Fred Gerlach
his Atty.

Patented Oct. 26, 1943

2,333,060

UNITED STATES PATENT OFFICE 2,333,060

CONTROL MECHANISM FOR LOCOMOTIVE SANDERS

Guilford S. Turner, Berwyn, Ill., assignor to Morris B. Brewster, Co., Chicago, Ill., a corporation of Illinois Application March 25, 1942, Serial No. 436,134

2 Claims. (Cl. 137—144)

The invention relates to control mechanism for locomotive sanders.

In sanders for locomotives it is desirable to deliver a short blast of air to a nozzle in the trap for clearing the sand-discharge pipe and air to the sand-discharge nozzle in the trap for a selective period, and to control such delivery by air from an operator's valve in the cab of the locomotive, through a relay or remote control valve which is shiftable by a fluid pressure unit by air from the operator's valve. Constructions are now used in which the relay valve includes a cylinder which is formed as an integral part of the valve-casing for a piston responsive to air from the operator's valve. Parts of the valve and fluid require replacement and repair. In such constructions it was necessary to replace or remove the entire combined valve and fluid pressure unit for repair or replacement.

One object of the invention is to provide control mechanism for a sander of this type which is composed of a separate valve-unit and a fluid-pressure unit which are separably removable from the locomotive and can be separately and readily removed and replaced. A single mounting is provided for both units which is adapted to be secured to the locomotive. The units are separately detachable from the mounting plate in the event it is necessary to remove either unit for repair of replacement while the other can remain attached to the mounting plate. In the event of a failure of one unit it is not necessary to replace the entire structure. In replacement of separate units, it is only necessary to remove the pipe connections for one unit, while those for the other can remain connected. This facilitates the time required in making replacements.

Another object of the invention is to provide a mechanism comprising an associated fluid pressure unit and a valve unit in which the connection or lever for shifting the valve is exposed so that it can be manually shifted in the event that the pressure unit becomes inoperative.

Another object of the invention is to provide control mechanism for sanders which can be produced and maintained at a low cost.

Other objects of the invention will appear from the detailed description.

The invention consists in the several novel features hereinafter set forth and more particularly defined by claims at the conclusion hereof.

In the drawing:

Fig. 1 is a vertical section of the control mechanism embodying the invention.

Fig. 2 is a plan.

Fig. 3 is a perspective of the mounting plate for the fluid pressure and valve unit.

Fig. 4 is a perspective of the body of the fluid pressure unit.

Fig. 5 is a perspective of the valve units.

The invention is exemplified in a mechanism which comprises a mounting plate $a$ which is adapted to fit against the wall or any suitable part of a locomotive and is provided with a pair of holes $a^2$ for screws 8 whereby the mounting plate may be secured to the locomotive. The mounting plate has a pair of tapped holes $a^3$ arranged laterally of each other in which are secured studs 9 for mounting a valve unit $c$ on the mounting plate. The mounting plate also has a pair of tapped holes $a^4$, one above the other and vertically aligned with one of the holes $a^2$, in which studs 10 are secured for mounting a fluid pressure unit $d$ on the plate $a$.

The valve unit $c$ comprises a body 11, which is provided in its lower end with an inlet chamber 12 to which a pipe 13 is connected for delivering air under pressure from a reservoir to the casing 11; an outlet chamber 14 which is connected to a pipe 15 which delivers air to the sand-delivery nozzle of the sand-trap; and a chamber 16 which is connected by a pipe 17 to deliver a blast to the clean-out nozzle of the sand-trap, which may be of the type illustrated in Patent No. 2,259,593, dated October 21, 1941. A valve-member 18 is slidably mounted and guided in the inlet chamber 12 and is adapted to be held closed against a seat 19 by a spring 20 which is interposed between the valve and a screw cap 11ª. A valve-member 21 is slidably mounted in the chamber 16 and has a downwardly extending stem 22 for engaging and opening valve-member 18 and an upwardly extending stem 23 which is guided in a head 24 which is screw-threaded into the upper end of casing 11. Valve-member 21 is normally positioned above the port leading to clean-out pipe 17 so that during its initial descending movement, air will pass from inlet chamber 12 around valve-member 18 to the clean-out pipe 17 until upon further downward movement it closes the outlet from chamber 16 to pipe 17 while air continues to pass to the pipe 15 for the sand-discharge nozzle. The body 11 has integrally formed therewith a rearwardly extending web 26 and laterally extending ears 27. The back face of the ears fits against the mounting plate. Ears 27 are provided with holes 28 for the studs 9, and nuts 29 on said studs are adapted to removably secure the valve-unit $c$ to the mounting plate $a$. The body 11, valve members 18 and 21 and the upwardly projecting stem 23 constitute a unit which is adapted to be readily attached and detached from the mounting plate independently of the device or unit for shifting the valve members.

The fluid-pressure unit d comprises a body 30 in which a cylinder 31 is formed. A piston 32 is slidable in cylinder 31. A removable head 33 to which is connected a pipe 34 for delivering air from the operator's valve in the cab to cylinder 31, closes the lower end of the cylinder. Piston 32 is provided with a stem 35 which extends through the top of body 30. A rocker lever 36 is fulcrumed on a pin 37 which extends through and is supported in ears 38 which are integral with and extend upwardly from the top of body 30. One end of the lever 36 is loosely connected by a pin 39 to the upper end of piston stem 35. The opposite end 40 of the lever is adapted to abut against the upper end of the stem 23 to shift the valve-members 21, 18 when air under pressure is delivered into the lower end of cylinder 31 and piston 32 is shifted. The body 30 of the fluid pressure unit c is provided with a rearwardly extending integral bracket 42, the back face of which is adapted to fit against the mounting plate a. Bracket 42 is provided with holes 41 for the mounting-studs 10 in the mounting plate a so that the unit d can be detachably secured to the mounting plate by nuts 43.

The body 30, with its bracket 42 and the cylinder, piston-stem and lever associated therewith, constitute a unit which can be readily attached and detached from the mounting plate a separately from the valve unit. The units are located side by side and the nuts for securing them to the mounting plate are accessible from the front.

The operation will be as follows: When the rails are to be sanded the engineer will shift the operator's valve in the cab to supply air under pressure through pipe 34 into the lower end of cylinder 31. Piston 32 will be raised and rock lever 36 to slide the valve stem 23 downwardly. The lower stem 22 will initially open valve 18 so that air from pipe 13 will flow into the valve-casing 11. Air will flow also through pipe 15 to the sand-discharge nozzle and through pipe 17 to the clean-out blast until valve-member 21 engages its seat 21ᵃ in the valve-casing when the further supply of air to the clean-out nozzle will be cut off. At the end of the sanding operation the engineer will cut off the supply of air through pipe 34 and spring 20 will close valve-member 18 to cut off air from pipe 13 and shift stems 22, 23 and valve-member 21 upwardly. Stem 23 will rock lever 36 and the latter will restore the piston to its lowered position in cylinder 31.

In the event that a repair or replacement is necessary of the fluid pressure unit d it can be separately removed from the mounting plate a by removal of the nuts 43 which secure said unit to the mounting plate while the valve unit c remains attached to said plate. In the event that repair or replacement is necessary of the valve-unit c it can be removed independently of the fluid pressure unit c upon removal of nuts 29. In the event that the fluid pressure unit should become inoperative during a run the engineer can attach a string or wire to the lever 36 by means of a hole 36a in the lever and by looping the wire or cord under the web 26 which extends rearwardly from the valve-casing 11. The engineer can then operate the lever 36 manually to shift the stem 23 by a pull on the wire or cord.

The invention exemplifies control mechanism for sanders in which the valve-unit and the fluid pressure unit are separately removable from the mounting plate for individual replacement of the units. The valve shifting lever 36 is outside of the valve-casing and the body of the fluid pressure unit for access and manual operation in the event that the fluid pressure unit fails to operate. The separate units can be readily fabricated at a low cost and in the event of replacement it is not necessary to replace both units unless they have both become ineffective.

A further advantage in providing separate fluid pressure and valve units is that it is not necessary to disconnect the pipe connections from both units when it is only necessary to remove or replace one of the units.

The invention is not to be understood as restricted to the details set forth since these may be modified within the scope of the appended claims without departing from the spirit and scope of the invention.

Having thus described the invention, what I regard as new and desire to claim by Letters Patent is:

1. In control mechanism for sanders the combination of a mounting plate provided with a pair of holes disposed lateraly of one another in its lower portions for bolts whereby the plate may be secured to a locomotive, a valve unit separable from the mounting plate and comprising a casing having a pair of lugs having holes disposed laterally of each other, integral with, and at back of and spaced from the upper portion of the casing and fitting against the upper portion of the mounting plate, and valve means in the casing for controlling the flow of air from the casing to clean-out and sand-discharge connections, provided with a stem projecting from the top of the casing, a fluid pressure unit comprising a body separately formed and disposed at one side of the casing, a piston-stem projecting upwardly from the body, a lug integral with and projecting from the back and laterally to the other side of the body and provided with a pair of vertically spaced holes, an upwardly projecting ear on the top of the body, and a rocker lever pivotally supported by said ear, operatively connected at one of its ends to the piston-stem and having its other end in abutting engagement with the stem on the valve means, the units being positioned on the mounting plate so the stems are movable on parallel axes, and means for separately and removably securing the lugs on the valve-casing and the lugs on the body to the mounting plate.

2. In control mechanism for sanders the combination of a mounting plate provided with a pair of holes disposed laterally of one another in its lower portions for bolts whereby the plate may be secured to a locomotive, a valve unit separable from the mounting plate and comprising a casing having a pair of lugs having holes disposed laterally of each other, integral with, and at back of and spaced from the upper portion of the casing and fitting against the upper portion of the mounting plate, and valve means in the casing for controlling the flow of air from the casing to clean-out and sand-discharge connections, provided with a stem projecting from the top of the casing, a fluid pressure unit comprising a body separately formed and disposed at one side of the casing, a piston-stem projecting upwardly from the body, a lug integral with and projecting from the back and laterally to the outer side of the body and provided with a pair of vertically spaced holes, an upwardly projecting ear on the top of the body, and a rocker lever pivotally supported by said ear, operatively connected at one of its ends to the piston-stem and having its other end in abutting engagement with the stem on the valve means, the units being positioned on the mounting plate so the stems are movable on parallel axes, pairs of studs on the mounting plate extending through the holes in the lugs on the valve casing and the holes in the lug on said body, respectively, and nuts for separately and removably securing the valve casing on one pair of said studs and the lug on the body to the other pair of studs.

GUILFORD S. TURNER.